United States Patent
Nakazawa

(10) Patent No.: US 9,969,040 B2
(45) Date of Patent: May 15, 2018

(54) TOOL CHANGER

(71) Applicant: DMG MORI CO., LTD., Nara (JP)

(72) Inventor: Syunsuke Nakazawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 195 days.

(21) Appl. No.: 14/819,004

(22) Filed: Aug. 5, 2015

(65) Prior Publication Data

US 2016/0039060 A1     Feb. 11, 2016

(30) Foreign Application Priority Data

Aug. 7, 2014   (JP) .................................. 2014-161170

(51) Int. Cl.
*B23Q 3/157*     (2006.01)
*B23Q 11/00*     (2006.01)
*B23Q 3/155*     (2006.01)

(52) U.S. Cl.
CPC ....... *B23Q 3/15713* (2013.01); *B23Q 3/1554* (2013.01); *B23Q 11/00* (2013.01);
(Continued)

(58) Field of Classification Search
CPC ....... B23Q 2003/155418; B23Q 2003/155425; B23Q 2003/155428; B23Q 2003/155435; B23Q 2003/155439; B23Q 3/1554; Y10T 483/1755; Y10T 483/1767; Y10T 483/1779; Y10S 483/902
(Continued)

(56) References Cited

U.S. PATENT DOCUMENTS 3,249,997 A * 5/1966 Hutchens ........... B23Q 3/15533
                                                             483/39
4,414,732 A * 11/1983 Tomita ............... B23Q 3/15553
                                                             483/35
(Continued)

FOREIGN PATENT DOCUMENTS

JP     H04028931 U1    3/1992
JP     3048791 U       5/1998
(Continued)

OTHER PUBLICATIONS

Machine Translation of KR 10-0626125-B1, which KR '125 was published Sep. 2006.*

*Primary Examiner* — Erica E Cadugan
(74) *Attorney, Agent, or Firm* — Miller, Matthias & Hull LLP

(57) ABSTRACT

A tool changer 10 includes a tool change arm 40 having tool holding portions 42, 52 at ends thereof, a support shaft supporting the tool change arm 40, a rotation mechanism including a rotation drive motor 25 and rotating the tool change arm 40 about an axis of the support shaft, a forward/backward movement mechanism including a forward/backward movement drive motor 13 and moving the tool change arm 40 forward and backward along the support shaft, and a mount base 11 having the rotation drive motor 25, the forward/backward movement drive motor 13 and the support shaft mounted thereon. The tool changer has a restraining member 60 provided thereon which restrains movement of the tool change arm 40 in a direction along the support shaft by engaging with the tool change arm 40 positioned at an original position.

6 Claims, 6 Drawing Sheets

(52) U.S. Cl.
CPC ............ *B23Q 3/1574* (2013.01); *B23Q 2003/155428* (2016.11); *B23Q 2003/155439* (2016.11); *Y10S 483/902* (2013.01); *Y10T 483/11* (2015.01); *Y10T 483/1755* (2015.01); *Y10T 483/1767* (2015.01)

(58) Field of Classification Search
USPC .................................. 483/39, 44, 49, 902
See application file for complete search history.

(56) References Cited

U.S. PATENT DOCUMENTS

| | | | |
|---|---|---|---|
| 8,062,200 B2* | 11/2011 | Jajtic ............... | B23Q 1/4876 310/12.14 |
| 2017/0087679 A1* | 3/2017 | Yamamoto ......... | B23Q 3/15746 |

FOREIGN PATENT DOCUMENTS

| | | | |
|---|---|---|---|
| JP | 2000193062 A | | 7/2000 |
| JP | 2004028931 A | | 1/2004 |
| KR | 10-0626125 B1 | * | 9/2006 |
| WO | WO-2004-037484 A1 | * | 5/2004 |

* cited by examiner (a)

(b)

TOOL CHANGER

BACKGROUND

Field of the Disclosure

The present disclosure relates to a tool changer that replaces a tool attached to a spindle of a machine tool with a next tool positioned at a standby position.

Background of the Disclosure

Examples of conventional tool changers are disclosed in Japanese Unexamined Utility Model Application Publication H04-028931 and Japanese Unexamined Patent Application Publication No. 2000-193062. Both of these tool changers include a tool change arm having tool holding portions at both ends thereof, a support shaft provided in parallel to the spindle of the machine tool for supporting the tool change arm, a rotation mechanism including a rotation drive motor and rotating the tool change arm about an axis of the support shaft by rotational power of the rotation drive motor, and a forward/backward movement mechanism including a forward/backward movement drive motor and a ball screw and moving the tool change arm forward and backward along the support shaft by the ball screw driven by the forward/backward movement drive motor.

According to such a tool changer, a tool attached to the spindle is replaced with a next tool positioned at a standby position by carrying out the following tool change operations in sequence:

1) rotating the tool change arm about the axis of the support shaft by the rotation drive motor and causing one of the tool holding portions of the tool change arm to hold the tool attached to the spindle and the other of the tool holding portions to hold the next tool positioned at the standby position;
2) driving the ball screw by the forward/backward movement drive motor to move the tool changer arm along the support shaft and pull the tool out of the spindle;
3) rotating the tool change arm 180 degrees about the axis of the support shaft by the rotation drive motor;
4) driving the ball screw by the forward/backward movement drive motor to move the tool change arm backward along the support shaft and attach the next tool to the spindle; and
5) rotating the tool change arm about the axis of the support shaft by the rotation drive motor to return the tool change arm to an original position.

SUMMARY OF THE DISCLOSURE

However, in the above-described conventional tool changer, which is configured to move the tool change arm forward and backward by the forward/backward movement drive motor and the ball screw, has a problem that, for example, when supply of electric power to the forward/backward movement drive motor and the rotation drive motor is shut off for energy saving during in a standby state where the above-described tool change operations are not carried out, or when electric power supplied to the forward/backward movement drive motor is shut off by shutting off supply of electric power to the machine tool for stopping operation of the machine tool, the rotation of the forward/backward movement drive motor becomes free and the tool change arm, therefore, can be moved along the support shaft with relatively small power.

For example, in a case where the tool changer is provided on a vertical machine tool, the gravity of the tool change arm acts on the ball screw and the forward/backward movement drive motor connected to the ball screw in such a manner that they rotate about their respective axes; therefore, when, as described above, electric power supplied to the forward/backward movement drive motor is shut off and thereby the rotation of the forward/backward movement drive motor becomes free, the ball screw and the forward/backward movement drive motor rotate due to the gravity of the tool change arm and thereby the tool change arm moves downward.

Further, although detailed description is omitted here, each of the tool holding portions of the tool change arm typically has a lock mechanism provided thereon for locking the tool holding state and the lock mechanism includes a biasing body such as a spring. Therefore, there is a possibility that the tool change arm is moved by biasing forces of the biasing bodies when supply of electric power to the forward/backward movement drive motor is shut off. This phenomenon does not occur depending on the type of the machine tool on which the tool changer is provided, and may occur both on a vertical machine tool and on a horizontal machine tool.

Further, the movement of the tool change arm as described above causes a problem that the tool change arm interferes with other components and members surrounding the tool change arm.

Meanwhile, as a measure for solving these problems, as disclosed in Japanese Unexamined Utility Model Application Publication H04-028931 noted above, a motor with a brake may be employed as the forward/backward movement drive motor.

However, such a motor with a brake is expensive and electric power for releasing the brake is required when the motor is driven; therefore, such a motor has a problem that it is against power saving in terms of energy efficiency.

The present disclosure has been achieved in view of the above-described circumstances, and an object thereof is to provide a tool changer that is capable of preventing movement of the tool change arm while electric power to the forward/backward movement drive motor is off and that can realize the prevention with a simple configuration without increase in energy costs.

Accordingly, to solve the above-described problems, a tool changer is disclosed that is disposed at a tool change position in a machine tool for replacing a tool attached to a spindle with a next tool positioned at a standby position, and includes:
- a tool change arm having a tool holding portion at each of both ends thereof;
- a support shaft provided in parallel to the spindle for supporting the tool change arm;
- a rotation mechanism including a rotation drive motor and rotating the tool change arm about an axis of the support shaft by power of the rotation drive motor,
- a forward/backward movement mechanism including a forward/backward movement drive motor and moving the tool change arm forward and backward along the support shaft by power of the forward/backward movement drive motor, and
- a mount base having the rotation drive motor, the forward/backward movement drive motor and the support shaft mounted thereon,
- the tool changer having a restraining mechanism provided thereon for restraining movement of the tool change arm in a direction along the support shaft by direct engagement with the tool change arm positioned at an original position or indirect engagement with the tool change arm positioned at the original position through another member connected to the tool change arm.

According to the tool changer of the present disclosure, a tool attached to the spindle is replaced with a next tool positioned at the standby position by carrying out the following operations in sequence:
1) rotating the tool change arm in an appropriate direction about an axis of the support shaft from an original position by the rotation drive motor and causing one of the tool holding portions of the tool change arm to hold the tool attached to the spindle and the other of the tool holding portions to hold the tool positioned at the standby position, the original position being an angular position at which the tool change arm is in a standby state before start of the tool change operations;
2) driving the forward/backward movement drive motor to move the tool change arm forward along the support shaft and pull the tool out of the spindle;
3) rotating the tool change arm 180 degrees about the axis of the support shaft by the rotation drive motor;
4) driving the forward/backward movement drive motor to move the tool change arm backward along the support shaft and attach the next tool to the spindle; and
5) rotating the tool change arm about the axis of the support shaft by the rotation drive motor to return the tool change arm to the original position.

Further, when the tool change arm is positioned at the original position, the tool change arm is restrained from moving in a direction along the support shaft by the restraining mechanism. Therefore, when the tool change arm is positioned at the original position, even if supply of electric power to the forward/backward movement drive motor is shut off and the rotation of the forward/backward movement drive motor consequently becomes free, the tool change arm is restrained from moving in the direction along the support shaft by the restraining mechanism, and therefore the occurrence of the above-described conventional problems are prevented. Further, since the restraining mechanism restrains the tool change arm from moving in the direction along the support shaft by direct or indirect engagement with the tool change arm, it does not require electric power to restrain the tool change arm and its configuration is simple.

It is noted that the noise detection element detects a ground noise and an element that detects a noise current flowing through the electrodes, an antenna and a ground wire can be used as the noise detection element. The term "noise" means an environmental relative potential variation with respect to a detection reference potential of a self-capacitance detection type touch panel, for example; in order to detect this variation by the noise detection element, correlation between a noise level detected by the noise detection element and noise based on the detection reference potential of the touch panel should be obtained in advance.

Note that, in the present disclosure, the restraining mechanism can be provided on an end surface of the mount base having the support shaft mounted thereon.

Further, in the present disclosure, the tool changer may have a configuration in which the restraining mechanism is composed of a restraining member having an engagement groove that engages with the tool change arm positioned at the original position and the restraining member is disposed so that the tool change arm engages with the engagement groove when rotating and returning to the original position from a position it has reached by rotating toward the spindle.

According to the tool changer of the present disclosure, since movement of the tool change arm in a direction along the support shaft is restrained by the restraining mechanism when it is positioned at the original position, even if supply of electric power to the forward/backward movement drive motor is shut off and thereby the rotation of the forward/backward movement drive motor becomes free, the tool change arm is restrained from moving in the direction along the support shaft by the restraining mechanism, and therefore the occurrence of the above-described conventional problems are prevented. Further, since the restraining mechanism restrains movement of the tool change arm in the direction along the support shaft by engagement with the tool change arm, it does not require electric power to restrain the tool change arm and its configuration is simple.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
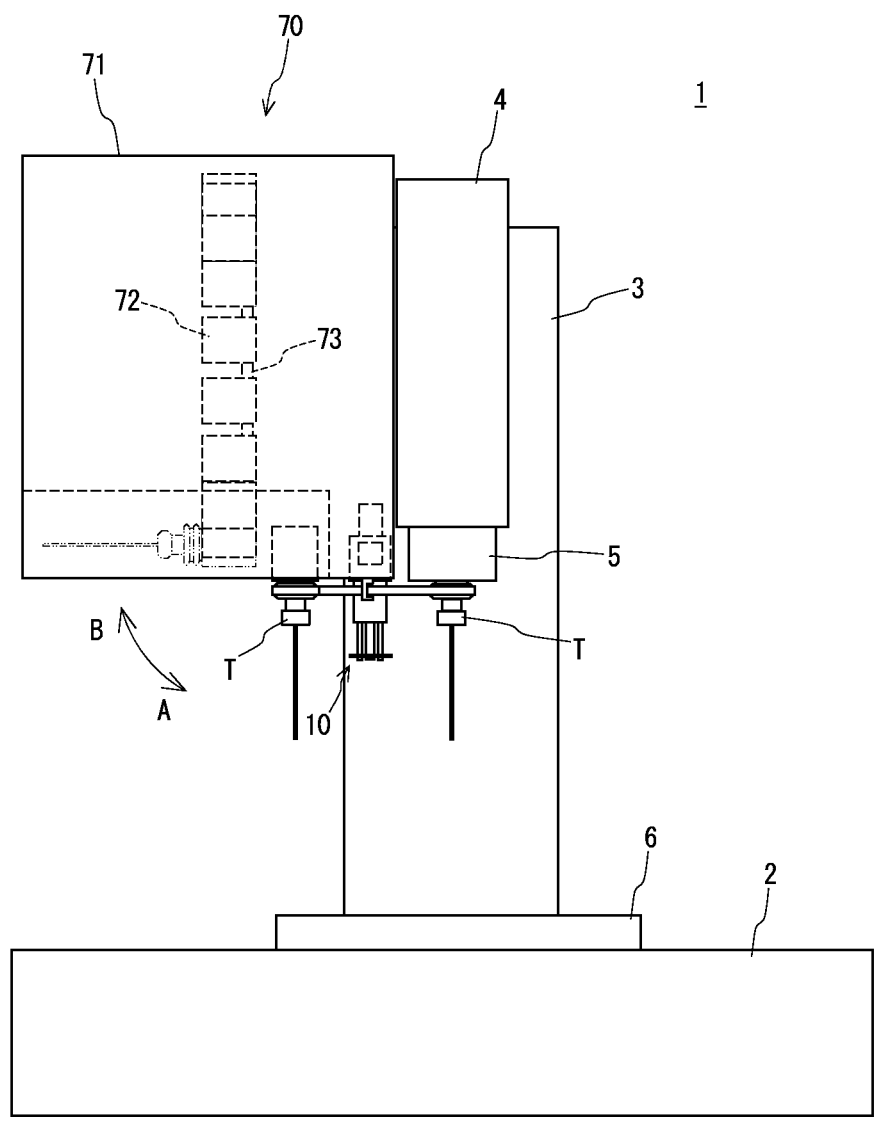
FIG. 1 is a front view of a machine tool according to one embodiment of the present disclosure.

A tool changer according to one embodiment of the present disclosure will be described below with reference to the drawings. As shown in FIG. 1, a tool changer 10 of this embodiment is attached to a machine tool 1. It is noted that there is no restriction on the machine tool to which the tool changer 10 of the present disclosure can be applied, and the tool changer 10 is applicable not only to a so-called vertical machining center as shown in FIG. 1 but also to a horizontal machining center, a composite lathe capable of turning and milling, and the like.

The machine tool 1 shown in FIG. 1 has been conventionally known and therefore does not need to be described in detail; however, the configuration of the machine tool 1 is briefly described as follows: the machine tool 1 includes a bed 2, a column 3 erected on the bed 2, a spindle head 4 disposed to the column 3 to be movable in a vertical up-down direction, a spindle 5 rotatably supported by the spindle head 4, a table 6 which is disposed on the bed 2 to be movable in two orthogonal horizontal axis directions and on which an appropriate workpiece is placed and fixed, and other components. Note that the reference numeral 70 indicates a tool magazine.

The spindle head 4 is configured to be moved in the up-down direction by an appropriate feed apparatus (not shown), and the table 6 is also configured to be moved in the two orthogonal horizontal axis directions by an appropriate feed apparatus (not shown). Further, the spindle 5 is rotated about an axis thereof by an appropriate spindle motor (not shown).

Operations of the feed apparatus (not shown) moving the spindle head 4, the feed apparatus (not shown) moving the table 6, the spindle motor (not shown) driving the spindle 5, the tool magazine 70, and the tool changer 10 are controlled by an appropriate controller, which is not shown in the drawings.

The tool magazine 70 has a plurality of tool pots 72 holding tools T, a holding plate 73 composed of a circular plate-shaped member and holding the tool pots 72 annularly arranged at an outer peripheral portion thereof, a drive motor (not shown) rotating the holding plate 73, a calling mechanism (not shown) moving the tool pot 72 positioned at a lower end position in the arrow A direction to position it at a standby position and moving the tool pot 72 positioned at the standby position in the arrow B direction B to cause the holding plate 73 to hold that tool pot 72. Note that the reference numeral 71 in FIG. 1 indicates a cover.

Figure 2:
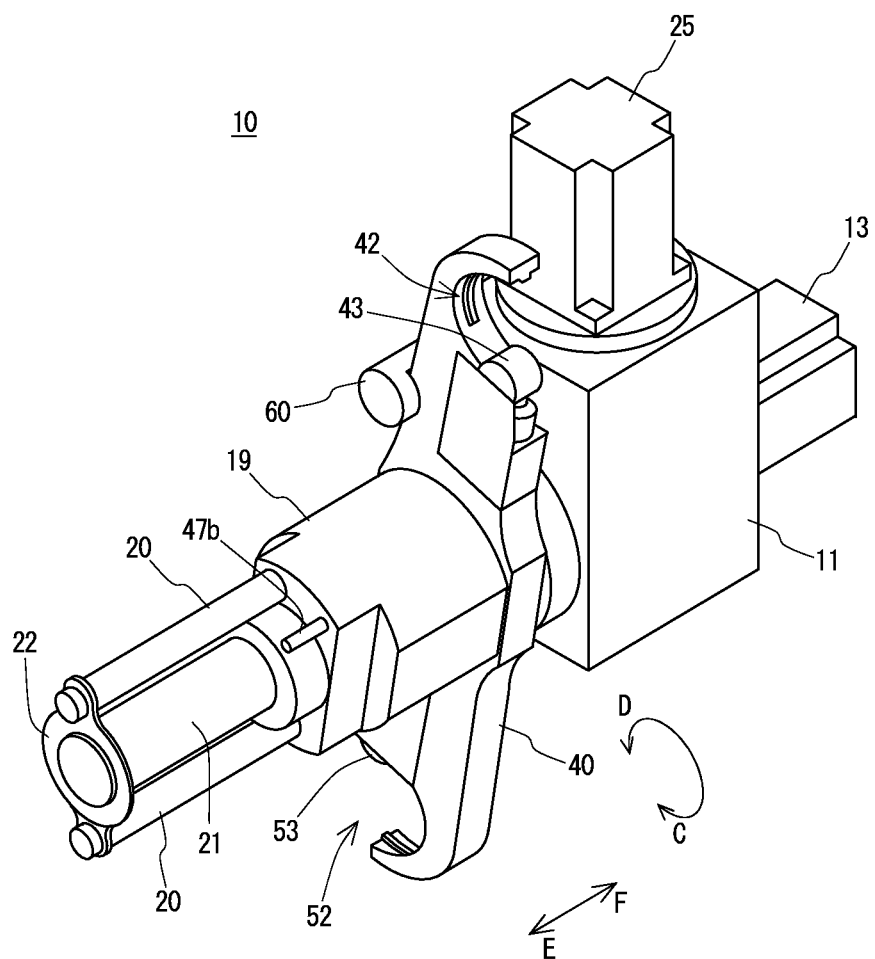
FIG. 2 is a perspective view of a tool changer according to the embodiment, seen obliquely from below.
Figure 3:
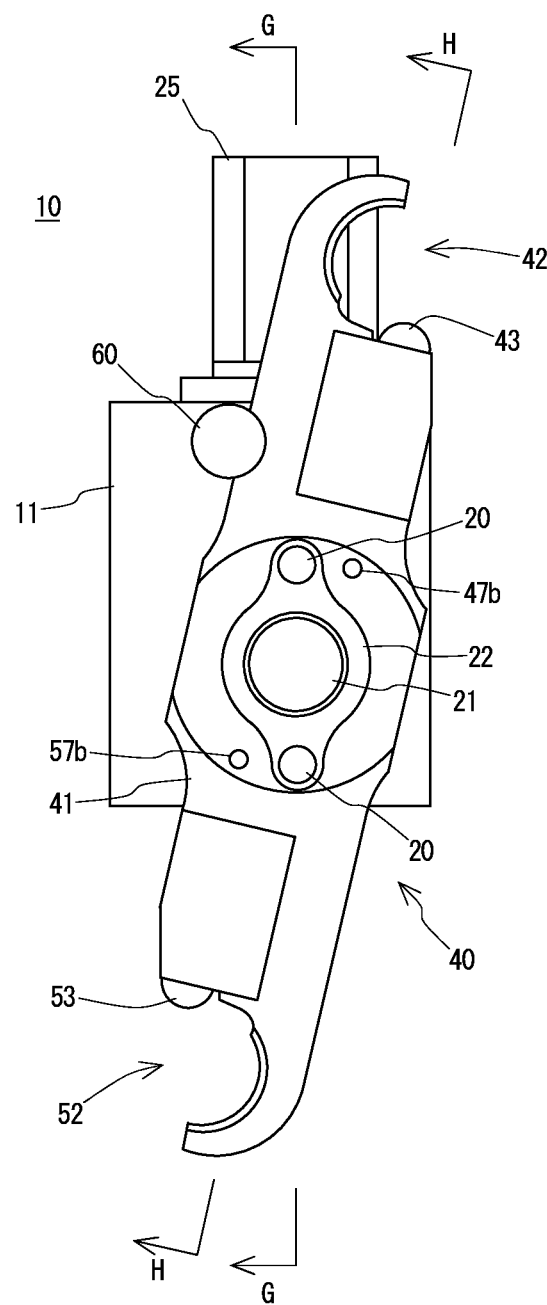
FIG. 3 is a bottom view of the tool changer according to the embodiment.
Figure 4:
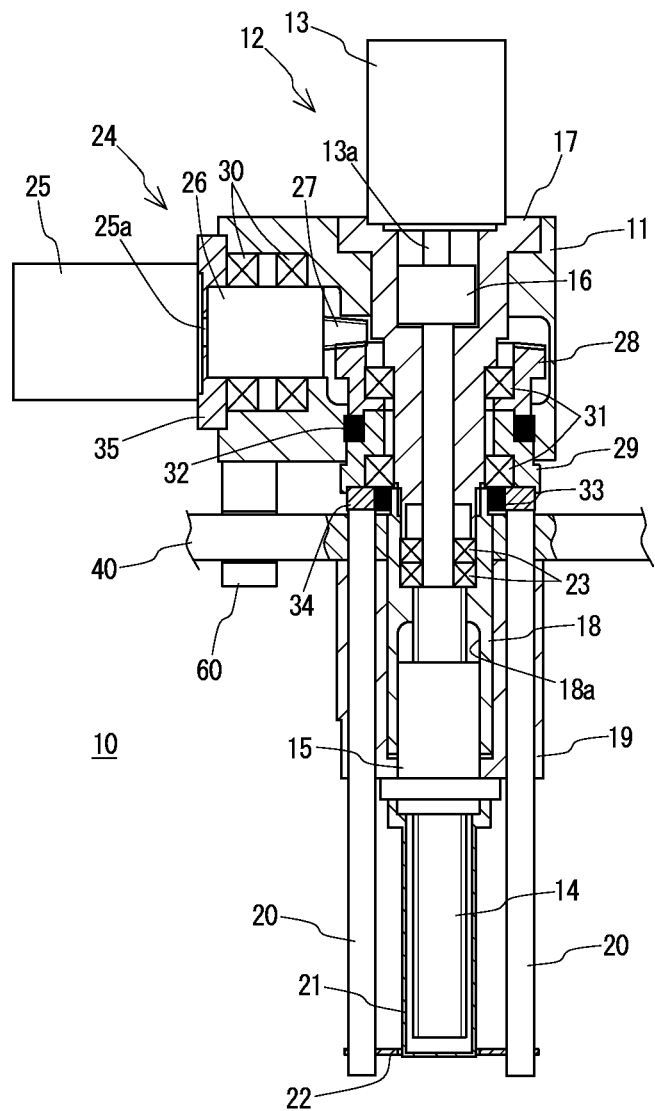
FIG. 4 is a sectional view taken along the arrows G-G of FIG. 3.

The tool changer 10 is a device for replacing a tool (current tool) T attached to the spindle 5 with a tool (next tool) T held by the tool pot 72 positioned at the standby position, and consists of, as shown in FIGS. 2 to 4, a tool change arm 40, a housing 11, a first support shaft 17, a second support shaft 18, a forward/backward movement mechanism 12, a rotation mechanism 24, a restraining member 60, and other components.

The housing 11 is composed of a prism-shaped member having an appropriate containing chamber therein, and has the first support shaft 17, the forward/backward movement mechanism 12, the rotation mechanism 24 and the restraining member 60 mounted thereon. The first support shaft 17 is mounted on the housing 11 so that it vertically penetrates through the housing 11, and is connected to the second support shaft 18 which is arranged coaxially below the first support shaft 17. Note that the following explanation about FIGS. 2 to 5 is based on the vertical relationship in FIG. 1.

The forward/backward movement mechanism 12 consists of a forward/backward movement drive motor 13 which is fixed on an upper end portion of the first support shaft 17 and operation of which is controlled by the controller (not shown), a ball screw 14 connected to an output shaft 13a of the forward/backward movement drive motor 13 through a coupling 16, and a ball nut 15 screwed on the ball screw 14. The ball screw 14 is inserted in through holes formed in the first support shaft 17 and the second support shaft 18 along the axial directions of them and is rotatably supported by bearings 23, 23 disposed in the though hole of the second support shaft 18. An upper end portion of the ball screw 14 is, as described above, connected to the output shaft 13a of the forward/backward movement drive motor 13 through the coupling 16. Further, the second support shaft 18 has a containing hole 18a formed therein which is open to a lower end surface of the second support shaft 18, and the ball nut 15 has an upper portion which is able to enter the containing hole 18a.

The tool change arm 40 is fitted on an upper end portion of the second support shaft 18 with the second support shaft 18 penetrating though the tool change arm 40; a holding member 19 fitted on the second support shaft 18 is disposed below the tool change arm 40 and the holding member 19 has an upper end portion fixed onto a lower surface of the tool change arm 40. Further, the ball nut 15 is fixed on a lower surface of the holding member 19 in a state of penetrating through the holding member 19, and the upper portion of the ball nut 15, as described above, is able to enter the containing hole 18a of the second support shaft 18. Furthermore, the ball nut 15 has a cylindrical cover 21 fixed on a lower surface thereof for covering the ball screw 14.

Thus, when the forward/backward movement drive motor 13 is driven by the controller (not shown) to rotate the ball screw 14 connected to the output shaft 13a in a normal-reverse direction, the ball nut 15 screwed on the ball screw 14, the holding member 19 and the cover 21 connected to the ball nut 15, and the tool change arm 40 connected to the holding member 19 move forward or backward in the direction indicated by the arrows E-F shown in FIG. 2 along the axis of the ball screw 14. Note that the arrow E direction is the forward direction and the arrow F direction is the backward direction; FIGS. 2 to 4 show a state where the ball nut 15, the holding member 19, the cover 21 and the tool change arm 40 are positioned at a backward end.

The rotation mechanism 24 includes a rotation drive motor 25, a coupling 26, a first bevel gear 27, a second bevel gear 28, a connecting body 29, a connecting ring 34 and two guide bars 20. The rotation drive motor 25 is mounted on a side surface of the housing 11 through a connecting ring 35. Further, the first bevel gear 27 is disposed within the containing chamber of the housing 11 so that an axis thereof is perpendicular to the axis of the first support shaft 17, and is connected to an output shaft 25a of the rotation drive motor 25 through the coupling 26. Note that the coupling 26 is rotatably supported by bearings 30, 30 disposed within the containing chamber of the housing 11. Further, the rotation drive motor 25 is controlled by the controller (not shown).

The second bevel gear 28 and the connecting body 29 are connected to each other in a coaxial state with the connecting body 29 below the second bevel gear 28; they are fitted on the first support shaft 17 through bearings 31, 31 and the second bevel gear 28 meshes with the first bevel gear 27. Further, the connecting ring 34 is fixed on a lower end surface of the connecting body 29, and the two guide bars 20, 20 are fixed on a lower end surface of the connecting ring 34; the guide bars 20, 20 are arranged in parallel so that they extend downward from the connecting ring 34 in a state of penetrating though the tool change arm 40 and the holding member 19. Further, a connecting plate 22 is fixed on lower end portions of the guide bars 20, 20.

The connecting plate 22 has a through hole formed therein and the cover 21 can be inserted through the through hole. Further, a seal 32 is disposed between an outer peripheral surface of the connecting body 29 and a corresponding inner peripheral surface of the housing 11, and the seal 32 provides sealing between the connecting body 29 and the housing 11. Similarly, a seal 33 is disposed between an outer peripheral surface of the second support shaft 18 and an inner peripheral surface of the connecting ring 34, and the seal 33 provides sealing between the second support shaft 18 and the connecting ring 34.

Thus, when the rotation drive motor 25 is driven by the controller (not shown) to rotate the first bevel gear 27 connected to the output shaft 25a in a normal-reverse direction, the second bevel gear 28 meshing with the first bevel gear 27, the connecting body 29, the connecting ring 34, the guide bars 20, 20 and the connecting plate 22 directly or indirectly connected to the second bevel gear 28, the tool change arm 40 and the holding member 19 through which the guide bars 20, 20 penetrate, and the ball nut 15 and the cover 21 directly or indirectly connected to the holding member 19 rotate in a normal-reverse direction, that is, the direction indicated by the arrows C-D, about the axes of the first support shaft 17 and the second support shaft 18. In this connection, the arrow C direction is a normal rotation direction and the arrow D direction is a reverse rotation direction in this embodiment.

Note that the guide bars 20, 20 play not only the role of rotating the tool change arm 40 but also the role of guiding movement of the tool change arm 40 and the holding member 19 when they move forward or backward in the direction indicated by the arrows E-F.

The tool change arm 40 includes a turning arm 41 composed of a plate-shaped member and the turning arm 41 has tool holding portions 42, 52 formed respectively on ends thereof for holding the tools T. Each of the tool holding portion 42, 52 has an arc shape having an open side at the side of one of the rotation directions (the normal rotation direction side) and can receive the tool T through the open side.

Figure 5:
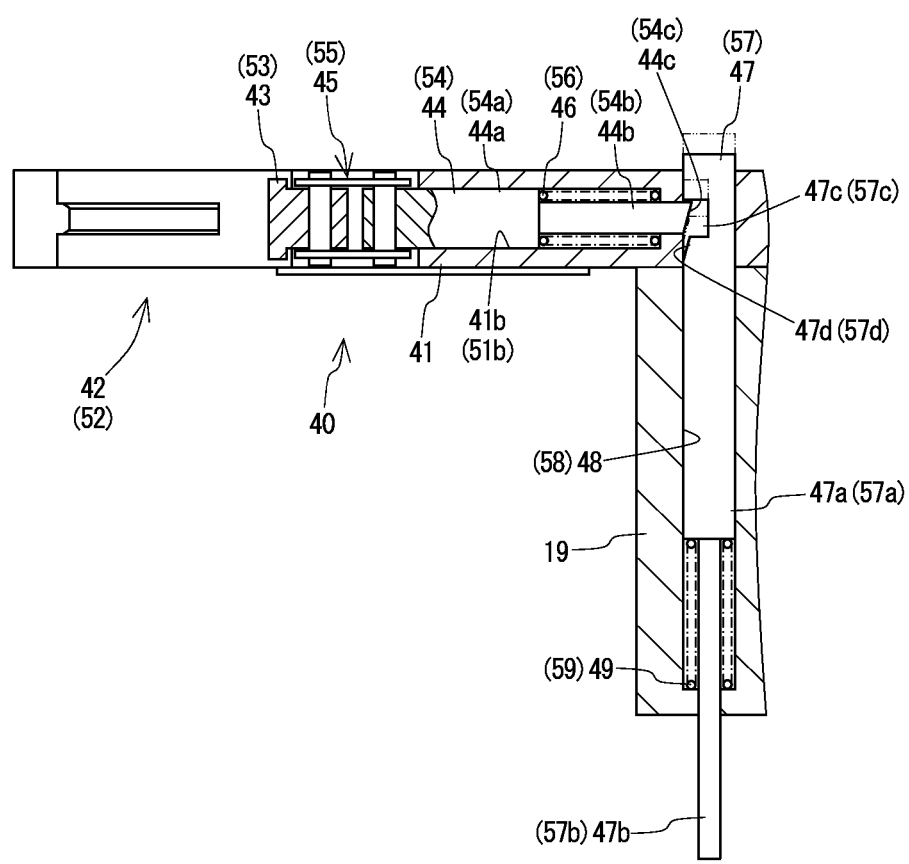
FIG. 5 is a partial sectional view taken along the arrows H-H of FIGS. 3.

Further, as shown in FIG. 5, each of the tool holding portions 42, 52 has a gripping jaw 43, 53 provided thereon; the gripping jaw 43, 53 moves forward and backward with respect to a holding space and is connected to a biasing rod 44, 54 through a link portion 45, 55. The biasing rod 44, 54 is a stepped rod consisting of a large diameter portion 44a, 54a and a small diameter portion 44b, 54b, and is inserted in a guide hole 41b, 51b formed in the turning arm 41 with the small diameter portion 44b, 54b first. Further, a compression coil spring 46, 56 is provided between an end surface of the large diameter portion 44a, 54a and a bottom surface of the guide hole 41b, 51b, being fitted on the small diameter portion 44b, 54b. The biasing rod 44, 54 is biased toward the tool holding portion 42, 52 by the compression coil spring 46, 56 and thereby the gripping jaw 43, 53 connected to the biasing rod 44, 54 is biased in a direction to move forward with respect to the holding space of the tool holding portion 42, 52.

Thus, when the tool T is inserted into the tool holding portion 42, 52, the gripping jaw 43, 53 moves backward because of contact with an outer peripheral surface of the tool T, thereby receiving the tool T in the tool holding portion 42, 52 and gripping the tool T in the tool holding portion 42, 52 by a biasing force of the compression coil spring 46, 56. On the other hand, when the tool T is pulled out of the tool holding portion 42, 52, the gripping jaw 43, 53 similarly moves backward, thereby allowing the tool T to be pulled out.

Further, the holding member 19 and the turning arm 41 have guide holes 48, 58 formed to be perpendicular to the axes of the guide holes 41b, 51b, and lock rods 47, 57 are inserted in the guide holes 48, 58, respectively. Each of the lock rods 47, 57 is a stepped rod consisting of an upper large diameter portion 47a, 57b and a lower small diameter portion 47b, 57b, and is inserted in the guide hole 48a, 58a so that the small diameter portion 47b, 57b penetrates though a lower end portion of the holding member 19 and extends outward and an upper end portion of the large diameter portion 47a, 57a extends above the turning arm 41. Further, a compression coil spring 49, 59 is provided between an end surface of the large diameter portion 47a, 57a and a bottom surface of the guide hole 48, 58, being fitted on the small diameter portion 47b, 57b; the lock rod 47, 57 is biased upward by the compression coil spring 49, 59.

Further, the lock rod 47, 57 has an escape hole 47c, 57c formed in the large diameter portion 47a, 57a at a portion intersecting with the axis of the biasing rod 44, 54, and an inclined surface 47d, 57d descending toward the escape hole 47c, 57c is formed below the escape hole 47c, 57c. Further, an end portion of the small diameter portion 44b, 54b of the biasing rod 44, 54 penetrates through the bottom of the guide hole 41b, 51b and is engaged with the escape hole 47c, 57c of the lock rod 47, 57, and an end surface 44c, 54c thereof is an inclined surface having the same inclination angle with the inclined surface 47d, 57d.

Thus, in a normal state, the lock rods 47, 57 are biased upward by the compression coil springs 49, 59 and the inclined surfaces 47d, 57d thereof are, as indicated by a dashed double-dotted line in FIG. 5, in contact with the end surfaces 44c, 54c of the biasing rods 44, 54, and thereby backward movement of the biasing rods 44, 54 is restrained, that is, locked. On the other hand, when the lock rods 47, 57 move downward due to an external force against the biasing forces of the compression coil springs 49, 59 and the escape holes 47c, 57c reach positions corresponding to the end surfaces 44c, 54c of the biasing rods 44, 54, the biasing rods 44, 54 become capable of moving backward; therefore, the tools T can be attached to or detached from the tool holding portions 42, 52.

Note that the tool changer 10 of this embodiment is configured so that, when, in FIG. 4, the tool change arm 40 and the holding portion 19 are positioned at the backward end, the upper end portions of the lock rods 47, 57 are brought into contact with the lower end surface of the connecting ring 34 and the lock rods 47, 57 move downward and the escape holes 47c, 57c correspond to the end portions of the biasing rods 44, 54. Therefore, in this embodiment, the tools T can be attached to or detached from the tool holding portions 42, 52 when the tool change arm 40 and the holding member 19 are positioned at the backward end; when the tool change arm 40 and the holding member 19 move downward, backward movement of the biasing rods 44, 54 is restrained, that is, the tools T being gripped by the gripping jaws 43, 53 are locked.

Figure 6:
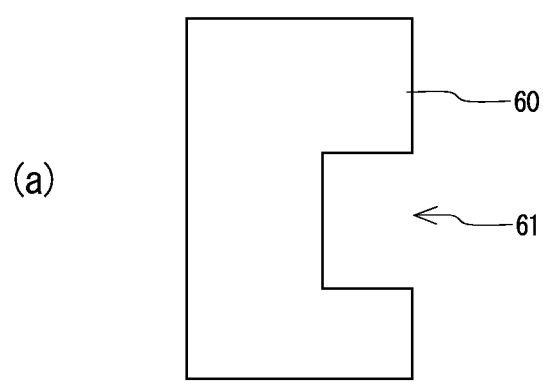
FIG. 6 shows (a) a plan view and (b) a front view of a restraining member according to the embodiment.
Figure 6:
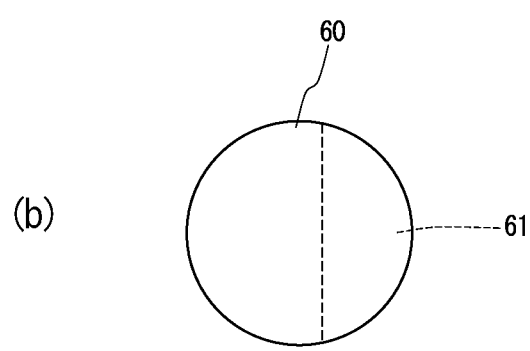

The restraining member 60 is, as shown in FIG. 6, composed of a cylindrical member and has an engagement groove 61 formed in a direction perpendicular to an axis thereof. As shown in FIGS. 2 and 3, this restraining member 60 is fixed on a front end surface of the housing 11 so that the turning arm 41 enters (engages with) the engagement groove 61 when the tool change arm 40 is positioned at the backward end and further positioned at a position shifted by a predetermined angle in the reverse rotation direction (the arrow D direction) from the spindle 5 (hereinafter, this position is referred to as "original position").

According to the tool changer 10 of this embodiment having the above-described configuration, a tool (current tool) T attached to the spindle 5 is replaced with a tool (next tool) T prepared at the standby position in a manner described below. Noted that, as shown in FIG. 1, the spindle 5 shall be positioned at a position for tool change (tool change position) and the next tool T shall be positioned at the standby position, and the tool change arm 40 shall be positioned at the original position as shown in FIGS. 2 and 3.

First of all, the controller (not shown) drives the rotation drive motor 25 to rotate the tool change arm 40 in the arrow C direction (normal rotation direction) about the axes of the first support shaft 17 and the second support shaft 18. Thereby, the engagement between the turning arm 41 and the engagement groove 61 of the restraining member 60 is released, and the tool (current tool) T attached to the spindle 5 is held by the tool holding portion 42 and the tool (next tool) T positioned at the standby position is held by the tool holding portion 52.

Subsequently, the controller (not shown) drives the forward/backward movement drive motor 13 to move the tool change arm 40 forward to a forward end, which is located underneath, along the first support shaft 17 and the second support shaft 18. Thereby, the tool (current tool) T is pulled out of the spindle 5 and the tool (next tool) T is pulled out of the tool pot 72 positioned at the standby position. Further, because of the downward movement of the tool change arm 40, the lock rods 47, 57 are moved upward by biasing forces of the compression coil springs 49, 59 and the gripping of the tools T by the gripping jaws 43, 53 is locked.

Thereafter, the controller (not shown) drives the rotation drive motor 25 to rotate the tool change arm 40 180 degrees in the arrow C direction (normal rotation direction) about the axes of the first support shaft 17 and the second support shaft 18. Thereby, the tool (next tool) T held by the tool holding portion 52 is positioned coaxially with the spindle 5 just below the spindle 5, while the tool (current tool) T held by the tool holding portion 42 is positioned just below the tool pot 72 positioned at the standby position.

Subsequently, the controller (not shown) drives the forward/backward movement drive motor 13 to move the tool change arm 40 backward to the backward end, which is positioned above, along the axes of the first support shaft 17 and the second support shaft 18. Thereby, the tool (next tool) T is attached to the spindle 5 and the tool (current tool) T is attached to the tool pot 72 positioned at the standby position. Further, because of the movement of the tool change arm 40 to the backward end, the lock rods 47, 57 move downward, and the lock of the gripping by the gripping jaws 43, 53 is released and thereby the tools T become able to be detached from the tool holding portions 42, 52.

Finally, the controller (not shown) drives the rotation drive motor 25 to rotate the tool change arm 40 in the arrow D direction (reverse rotation direction) about the axes of the first support shaft 17 and the second support shaft 18, thereby returning the tool change arm 40 to the original position. Thereby, the tools T are relatively pulled out of the tool holding portions 42, 52. Further, the turning arm 41 engages with the restraining member 60 by entering the engagement groove 61 of the restraining member 60, and thereby the tool change arm 40, the holding member 19, the ball nut 15 and the cover 21 are restrained from moving downward.

Thus, according to the tool changer 10 of this embodiment, when the tool change arm 40 is positioned at the original position, the tool change arm 40, the holding member 19, the ball nut 15 and the cover 21 is restrained from moving downward by the restraining member 60; therefore, their downward movement is prevented even if supply of electric power to the forward/backward movement drive motor 13 is shut off when the tool change arm 40 is positioned at the original position.

If the restraining member 60 is not provided, when supply of electric power to the forward/backward movement drive motor 13 is shut off, the rotation of the forward/backward movement drive motor 13 becomes free and a downward force acts on threads of the ball screw 14 through the ball nut 15 and the ball screw 14 due to the gravities of the tool change arm 40, the holding member 19, the ball nut 15 and the cover 21 and the biasing forces of the compression coil springs 49, 59, and the rotation drive motor 13 connected to the ball screw 14 rotate, which causes the tool change arm 40, the holding member 19, the ball nut 15 and the cover 21 to move downward. Therefore, if there are other components below the tool changer 10, for example, if the table 6 has a workpiece and a jig for attachment of the workpiece thereon, there is a possibility that the tool changer 10 or the tools T interfere with these components and such interference can cause damage to the tool changer 10 or the tools T and other unexpected inconveniences.

According to the tool changer 10 of this embodiment, since the tool change arm 40 etc. can be held at the original position by the restraining member 60 even when supply of electric power to the forward/backward movement drive motor 13 is shut off, the occurrence of the inconveniences as described above can be prevented.

Further, since the restraining member 60 is configured to restrain movement of the tool change arm 40 etc. by engagement between the engagement groove 61 thereof and the turning arm 41, it does not require electric power to restrain them and its configuration is simple.

Thus, one embodiment of the present disclosure has been described above; however, the present disclosure is not limited to this embodiment.

For example, as described above, there is no restriction on the machine tool to which the tool changer 10 of this embodiment can be applied, and the tool changer 10 can be preferably applied to not only a so-called vertical machining center as used in this embodiment but also a horizontal machining center, a composite lathe capable of turning and milling, and the like.

Note that, in the case of applying the tool changer 10 of this embodiment to a horizontal machining center, the gravities of the tool change arm 40, the holding member 19, the ball nut 15 and the cover 21 do not act on the ball screw 14 in the axial direction of the ball screw 14, while the biasing forces of the compression coil springs 49, 59 act on the ball screw 14 in the axial direction of the ball screw 14. Therefore, if the restraining member 60 is not provided, the tool change arm 40 etc. move in the axial direction of the ball screw 14 due to the biasing forces of the compression coil springs 49, 59 when supply of electric power to the forward/backward movement drive motor 13 is shut off; therefore, if components such as a cover are located near the tool changer 10, there is a possibility that the tool change arm 40 etc. interfere with the components. The occurrence of such a problem can be avoided by providing the retraining member 60.

Further, although the restraining member 60 is provided on the housing 11 in the above embodiment, the present disclosure is not limited to this configuration and the restraining member 60 may be provided on any member as long as it is capable of engaging with the turning arm 41 positioned at the original position.

Furthermore, although, in the above embodiment, the restraining member 60 is configured to restrain movement of the tool change arm 40 etc. by engagement between the engagement groove 61 thereof and the turning arm 41, the restraining member 60 is not limited to this configuration and may have any configuration as long as it is capable of restraining movement of the tool change arm 40 etc. For example, the tool changer 10 may have a configuration in which one of the turning arm 41 and the restraining member 60 has an engagement hole formed therein and the other of them has an engagement pin provided thereon, the engagement pin and the engagement hole are engaged with each other when the turning arm 41 returns to the original position, and their engagement relationship restrains the tool change arm 40 etc. from moving in the axial direction of the ball screw 14.

Further, although, in the above embodiment, the upper end portion of the holding member 19 is fixed on the lower surface of the tool change arm 40 (the turning arm 41), the present invention is not limited to thereto, and the holding member 19 may be fixed on the tool change arm 40 (the turning arm 41) in a state of penetrating through the tool change arm 40 (the turning arm 41). Further, the holding member 19 may have a rod member provided on a portion thereof above the tool change arm 40 (the turning arm 41); the rod member extends along the tool change arm 40 (the turning arm 41) and is engaged with an appropriate engagement member. In this case, the rod member and the engagement member form a restraining mechanism, and the tool change arm 40 is indirectly engaged with the restraining mechanism though the holding member 19 and is restrained from moving downward by the restraining mechanism. Note that the above-described restraining member 60 having the engagement groove 61 or a member having an engagement hole to be engaged with the rod member can be used as the engagement member.

Furthermore, although, in the above embodiment, the restraining member (restraining mechanism) is provided on the housing 11, the present disclosure is not limited to this configuration and the tool changer of the present disclosure may have a configuration in which the holding member 19 has two forward/backward movement grooves formed in an inner peripheral surface thereof, which extend along the axial direction of the holding member 19 and face each other with the axis of the holding member 19 between them, and has rotation grooves formed in the inner peripheral surface thereof corresponding to upper and lower ends of the forward/backward movement grooves, which are annular in the circumferential direction of the holding member 19, and the second support shaft 18 has a protrusion provided on an outer peripheral surface thereof, which is engaged with the forward/backward movement grooves when the tool change arm 40 is positioned at a rotational angular position where it is capable of moving in the direction E-F, and is engaged with the upper rotation groove when the holding member 19 is positioned at the forward end and with the lower rotation groove when the holding member 19 is positioned at the backward end. When thus configured, when the tool change arm 40 is positioned at the original position and is not positioned at the rotational angular position where it is capable of moving in the direction E-F, the rotation groove and the protrusion are engaged with each other and thereby downward movement of the tool change arm 40 is restrained. In this case, the rotation groove and the protrusion form a restraining mechanism. Note that, also in this case, the tool change arm 40 is indirectly engaged with the restraining mechanism though the holding member 19 and is restrained from moving downward by the restraining mechanism.

What is claimed is:

1. A tool changer disposed at a tool change position in a machine tool and for replacing a tool attached to a spindle with a next tool positioned at a standby position, comprising:
    a tool change arm having a tool holding portion at each of both ends thereof;
    a support shaft for supporting the tool change arm, the support shaft having an axis that is parallel to a rotation axis of the spindle;
    a rotation mechanism including a rotation drive motor, the rotation mechanism rotating the tool change arm about the axis of the support shaft by power of the rotation drive motor;
    a forward and backward movement mechanism including a forward and backward movement drive motor, the forward and backward movement mechanism moving the tool change arm forward and backward along the axis of the support shaft by power of the forward and backward movement drive motor; and
    a mount base having the rotation drive motor, the forward and backward movement drive motor and the support shaft mounted thereon;
    the tool changer having a restraining mechanism provided thereon, the restraining mechanism including a restraining member directly engaging with the tool change arm, when the tool change arm is positioned at an original position, to restrain forward movement of the tool change arm in a direction along the axis of the support shaft;
    the original position being a shifted position at which the tool change arm is positioned at a backward end in the direction along the axis of the support shaft and to which the tool change arm is rotated about the axis of the support shaft by a predetermined angle in a direction away from a position at which the tool change arm is located when one of the tool holding portions is configured to hold the tool that is attached to the spindle; and
    the restraining member being fixed to the mount base and being incapable of relative movement relative to the mount base in the direction along the axis of the support shaft when the restraining member directly engages the tool change arm to restrain the forward movement of the tool change arm.

2. The tool changer according to claim 1, wherein the restraining member is fixed to an end surface of the mount base.

3. The tool changer according to claim 2, wherein:
    the restraining member has an engagement groove configured to receive a portion of the tool change arm; and
    the restraining member is disposed so that the tool change arm engages with the engagement groove when the tool change arm is positioned at the backward end in the direction along the axis of the support shaft and is rotated about the axis of the support shaft to an angular position that is the original position.

4. The tool changer according to claim 3, wherein the tool change arm is rotatable via the rotation drive motor about the axis of the support shaft in a first direction to remove the portion of the tool change arm from the engagement groove, and in a second direction to place the portion of the tool change arm into the engagement groove.

5. The tool changer according to claim 1, wherein:
    the restraining member has an engagement groove configured to receive a portion of the tool change arm; and
    the restraining member is disposed so that the tool change arm engages with the engagement groove when the tool change arm is positioned at the backward end in the direction along the axis of the support shaft and is rotated about the axis of the support shaft to an angular position that is the original position.

6. The tool changer according to claim 5, wherein the tool change arm is rotatable via the rotation drive motor about the axis of the support shaft in a first direction to remove the portion of the tool change arm from the engagement groove, and in a second direction to place the portion of the tool change arm into the engagement groove.

* * * * *